Patented May 10, 1949

2,469,729

UNITED STATES PATENT OFFICE 2,469,729

HEAT EXCHANGE METHOD FOR THE DROP-WISE CONDENSATION OF VAPORS

James B. Hunter, Upper Darby, Pa., assignor to The Atlantic Refining Company, Philadelphia, Pa., a corporation of Pennsylvania No Drawing. Application December 28, 1945, Serial No. 637,768

2 Claims. (Cl. 257—28)

The present invention relates to a method of heat exchange, and more particularly to the condensation of vapors in heat exchange apparatus such as a surface condenser, in which condensation is effected by the transfer of heat to a cooling fluid through a wall interposed between the vapors and the cooling fluid.

In apparatus of this type, the vapor condenses upon the wall which separates it from the cooling fluid and wets the wall so that a layer of condensate is always present upon the condensing surface, i. e., the surface of the wall adjacent the vapor. This layer of condensate insulates the condensing surface and seriously limits the condensing capacity of the apparatus, namely, limits the amount of vapor that may be condensed per unit time with a unit area of condensing surface and with a given difference in temperature between the vapor and the cooling fluid.

In accordance with the present invention, there is employed a condensing surface substantially permanently modified so that it is not wetted by the condensate and so that the latter is caused to gather in the form of drops on the condensing surface, leaving a substantial portion of the condensing surface directly exposed to the vapor and available for effecting heat transfer at a maximum rate. Thus, the condensing surface is treated to leave a thin film of an agent which has the ability to adhere tenaciously to the condensing surface and not be displaced by the normal action of the vapor or its condensate, and which is non-wettable by the condensate. The treating agent is used in such quantity as to form an extremely thin film upon the condensing surface, so as not to introduce a substantial additional thermal resistance. The drop-wise condensation effected in accordance with this invention increases many fold the individual coefficient of heat transfer from condensing vapor to a solid surface expressed as the quantity of heat transfer per unit time per unit surface area per unit difference in temperature between the vapor and the condensing surface.

I have found that condensing surfaces such as those fabricated from iron, steel, alloy steels, copper, brass, bronze, Monel metal, or glass, when treated with an organo-silicon halide or mixture of such halides, are modified in such a manner as to promote dropwise condensation of vapors, thereby greatly increasing the capacity for heat transfer of the condensing surfaces.

The organo-silicon halides which may be employed in modifying the condensing surface include the alkyl silicon chlorides and the aryl silicon chlorides, and in fact any hydrocarbon-substituted silicon halide which is susceptible of application to a condensing surface to form thereon a thin, heat-resistant, insoluble silicol or silicone film. The alykyl silicon chlorides are exemplified by the mono-, di-, and trimethyl silicon chlorides, ethyl silicon chlorides, propyl silicon chlorides, butyl silicon chlorides, and the higher homologues thereof, as well as the various halogenated alkyl silicon chlorides. The aryl silicon chlorides are represented by phenyl silicon chloride, tolyl silicon chloride, xylyl silicon chloride, ethyl phenyl silicon chloride, propyl phenyl silicon chloride, and the high alkylated phenyl silicon chlorides, as well as the halogenated aryl silicon chlorides. Mixed organo-silicon chlorides in which both alkyl and aryl substituents occur may also be used. These are exemplified by dimethyl mono-phenyl silicon monochloride, mono-methyl mono-phenyl silicon dichloride, and diethyl mono-phenyl silicon monochloride. Although it is preferred to employ chlorine as the halogen constituent in the organo-silicon halides, the other halogens iodine, bromine, and fluorine may be substituted therefor.

The various organo-silicon halides may be prepared by conventional methods such as the Grignard reaction, wherein an alkyl or aryl magnesium halide is reacted in either solution with a silicon tetrahalide such as silicon tetrachloride. The resulting alkyl or aryl silicon halide is separated from the precipitated magnesium salt, and may be purified by fractional distillation at reduced pressure, or by other means. Since the preparation of these compounds is well known and forms no part of the present invention, further discussion thereof is here unnecessary.

In applying the organo-silicon halide to the condenser surface to be modified, such surface is preferably thoroughly cleaned with an abrasive or wire brush, then washed with a solvent or a soap solution to remove grease and foreign solids, and finally immersed in water for a short period of time. The water is then drained off and the organo-silicon halide is applied preferably in the form of a vapor to the condenser surface containing adsorbed moisture. This may be accomplished by passing a dry gas, such as air, over or through a quantity of the organo-silicon halide contained in a suitable vessel, and the resulting air saturated with the halide is then contacted with the surface to be treated. The reaction between the organo-silicon halide vapor and the surface moisture produces a thin film of a silicol, which upon continued exposure to air at ordinary temperature, further condenses with loss of water to a stable, tenaciously-adhering film of insoluble silicone or silicone polymer. The hydrogen halide produced as a by-product during the initial reaction between the organo-silicon halide and the moisture adsorbed upon the condenser surface may be removed by playing a stream of dry air over the treated surface. If desired, the air may contain ammonia to effect neutralization of the hydrogen halide. After the above treatment, the treated surface is in condition for use in the drop-wise condensation of vapors. While it is preferred to apply the organo-silicon halide in the form of a vapor, such halide may also be utilized in solution in a volatile, inert solvent. In this case, the water-moist condenser surface is contacted with a fine spray, fog, or mist of the organo-silicon halide in the solvent, and the latter is removed by vaporization or air drying. The condenser surface may be either the inner or outer surface of metal or glass tubing, or the walls of a chamber, or the surfaces of one or more plates disposed in heat exchange relation with the vapors to be condensed. While the surface condensers utilized in accordance with the present invention are primarily for the condensation of steam, such condensers may also be employed in the cooling or condensation of vapors of organic compounds which are inert toward the silicone or silicone polymer films. The composition and properties of the films employed in this invention are dependent upon both the composition of the organo-silicon halide initially used, and the nature of the agent initially adsorbed upon the condenser surface. For example, a trialkyl silicon monochloride when reacted with water gives a trialkyl silicol $R_3Si.OH$, the condensation of two molecules of which produces an ether-like compound $R_3Si.O.SiR_3$. The trialkyl silicon monochloride when reacted with a monohydric alcohol in lieu of water gives an ether such as $R_3Si.O.R$, and with a polyhydric alcohol such as glycol, a complex ether

$R_3Si.OCH_2CH_2.O.SiR_3$

On the other hand, a dialkyl silicon dichloride when reacted with water, gives a dialkyl silicol $R_2Si(OH)_2$, the condensation of a plurality of molecules of which produces a linear silicone polymer $R_2Si.O.SiR_2.O.SiR_2.O.SiR_2 \ldots O.SiR_2$. The dialkyl silicon dichloride when reacted with a monohydric or polyhydric alcohol in lieu of water, gives a complex linear polymer in which the $R_2Si$— groups are linked through RO— or through —$OCH_2CH_2O$—. The reaction of a mono-alkyl silicon trichloride with water, or with mono- or polyhydric alcohol gives rise to very complex cross-linked silicone polymers, which, like the compounds exemplified above, are suitable for the filming of surface condenser or heat exchange surfaces to give drop-wise condensation. For example, a condensing surface such as the internal surface of a metal tube may be wetted with an alcohol such as ethyl alcohol by swabbing or spraying, and any excess alcohol may be drained off leaving the interior of the tube wetted with a film of alcohol. To obtain the desired silicone as a film coating the interior of the tube, a stream of air may be passed through a body of liquid organo-silicon halide such as trimethyl silicon chloride, the air thus becoming saturated with the chloride, and the air stream containing such chloride is then passed through the tube, the internal surface of which is wetted with alcohol. The trimethyl silicon chloride in the air stream, upon contact with the alcohol on the tube surface, reacts with the alcohol to produce a water-insoluble film which adheres tightly to the tube surface, such film consisting of the ethyl ether of trimethyl silicon and having the formula $(CH_3)_3Si.O.C_2H_5$. Such film is the reaction product of the alcohol and the organo-silicon halide, i. e., trimethyl silicon chloride, and has the property of promoting drop-wise condensation of vapors, for example, steam, thus increasing the efficiency of the tube surface when used as a condenser. In lieu of the trimethyl silicon chloride, there may be used other organo-silicon halides such as dimethyl silicon dichloride, which when reacted with an alcohol-wetted surface, produces a water-insoluble film having a more complex chemical formula in which the $(CH_3)_2Si$— group is combined with the —$OC_2H_5$ group of the alcohol. When a polyhydric alcohol such as ethylene glycol is used in lieu of ethyl alcohol, the composition of the resulting film becomes even more complex, the $(CH_3)_3Si$— or $(CH_3)_2Si$— groups of the organo-silicon halides being combined with the —$OCH_2CH_2O$— group from the ethylene glycol. All of these more complex silicon compounds likewise provide water-insoluble films which adhere tightly to the tube surface and promote drop-wise condensation of vapors brought into contact with film-coated surface of the tube. While the above description has been confined to the application of films to condensing surfaces, such as tubes, it is obvious that the films likewise may be formed on any other type of condensing surface, for example, metal plates, baffles, etc., which form the surface through which heat exchange is effected.

My invention may be further illustrated by the following examples, which, however, are not to be construed as limiting the scope thereof.

A plurality of condenser tubes fabricated of various metals were thoroughly cleaned externally with an abrasive and then washed with a soap solution, followed by distilled water to remove traces of abrasive, grease or oil, or other foreign materials. The thoroughly cleaned tubes were then immersed in distilled water for 15 minutes, and thereafter removed and drained of water. The external surfaces of the tubes, while still moist, were then treated with an organo-silicon chloride at about 70° F. to produce silicol or silicone films. To accomplish this, dry air was bubbled through the organo-silicon chloride and the air thus saturated with the chloride was passed over the surface of the moist tubes for 15 minutes. Reaction between the halide vapor and the surface moisture produced a thin, water repellent film of a silicol or silicone polymer which adhered tenaciously to the external surfaces of the tubes. The supply of halide vapor was then discontinued, and dry air was passed over the tubes for 1 hour to completely remove the hydrogen halide formed during the reaction. After this treatment no visible deposit or film was observable on the tube surfaces. The treated tubes, as well as a plurality of cleaned, untreated tubes were disposed in a steam chamber, one end of the tubes being connected through a manifold to a cold water supply, and the other end of the tubes opening into a discharge sump. Cold water was passed through the tubes and low pressure steam was supplied to the steam chamber surrounding the tubes. The external tube surfaces were observed periodically to determine whether film condensation or drop-wise condensation of the steam was obtained, the test being carried on continuously for 48 hours. The results of the test are given in the following table, wherein "F" means "film condensation" and "D" means "drop-wise condensation."

| Metal Tube | Treatment | | |
|---|---|---|---|
| | Untreated | Diethyl silicon dichloride | Monoethyl silicon trichloride |
| Steel | F | D | D |
| Copper | F | D | D |
| Brass | F | D | D |
| Glass | F | D | D |

In the case of the diethyl silicon dichloride, the reaction with adsorbed moisture apparently produced a diethyl silicol, which in turn condensed with elimination of water to give a linear silicone polymer comprising a plurality of $(C_2H_5)_2Si<$ groups linked to one another through —O—. The monoethyl silicon trichloride, on the other hand, when reacted with adsorbed moisture, produced a monethyl silicol $C_2H_5.Si(OH)_3$, a plurality of molecules of which condensed with the elimination of water to give complex cross-linked silicone polymers. As will be seen from the above tests, the tubes treated with the organo-silicon chlorides gave drop-wise condensation of the steam, while the untreated tubes gave film condensation. While, in the above examples, the condensing surface was modified by first wetting with water and then treating with the vapors of an organo-silicon halide, such treatment may be reversed; i. e., the surface may be wetted or treated with the organo-silicon halide either as vapor or liquid, and thereafter treated with water in the form of a vapor, fog, or mist. Regardless of the order of application, the treatments may be carried out at ordinary temperatures, i. e., 60° F. to 80° F., and after the application of the agents and reaction thereof, the temperature may be raised, for example, to 200° F. or 250° F. to accelerate the dehydration or condensation of the silicols to form adherent silicone polymers.

The use of silicol or silicone films in heat exchangers or vapor condensers comprises a marked improvement over the ordinary film condensers commonly in use, and over the treated condensing surfaces heretofore suggested in the prior art. Not only are the silicol or silicone films much more stable and resistant to removal by the vapors or the condensate, but such films are much more readily applied to heat exchange surfaces than are the films of the prior art such as those obtainable with fatty acids, waxes, xanthates, mercaptans, thiophosphates, etc.

I claim:

1. The method of effecting drop-wise condensation of vapors, which comprises contacting said vapors with a cooling surface coated with a thin film of a compound produced by wetting said surface with an alcohol and treating the wetted surface with an organo-silicon halide.

2. The method of effecting drop-wise condensation of vapors, which comprises contacting said vapors with a cooling surface coated with a thin film of a compound produced by wetting said surface with a polyhydric alcohol and treating the wetted surface with an organo-silicon halide.

JAMES B. HUNTER.

REFERENCES CITED

The following references are of record in the file of this patent:

UNITED STATES PATENTS

| Number | Name | Date |
|---|---|---|
| 1,995,361 | Nagle | Mar. 26, 1935 |
| 2,248,909 | Russell | July 8, 1941 |
| 2,306,222 | Patnode | Dec. 22, 1942 |

OTHER REFERENCES

"Heat Transfer Coefficients During Drop-wise Condensation of Steam," Transactions of American Institute of Chemical Engineers; vol. 31, No. 4, Dec. 25, 1935, pages 593–604, by W. M. Nagle et al.

"The Conditions for Drop-wise Condensation of Steam," same publication, pages 605–621, by T. B. Drew et al.